Dec. 31, 1940.  W. H. MILLER  2,226,826
QUICK DETACHABLE COUPLING
Filed Sept. 18, 1939  2 Sheets-Sheet 1
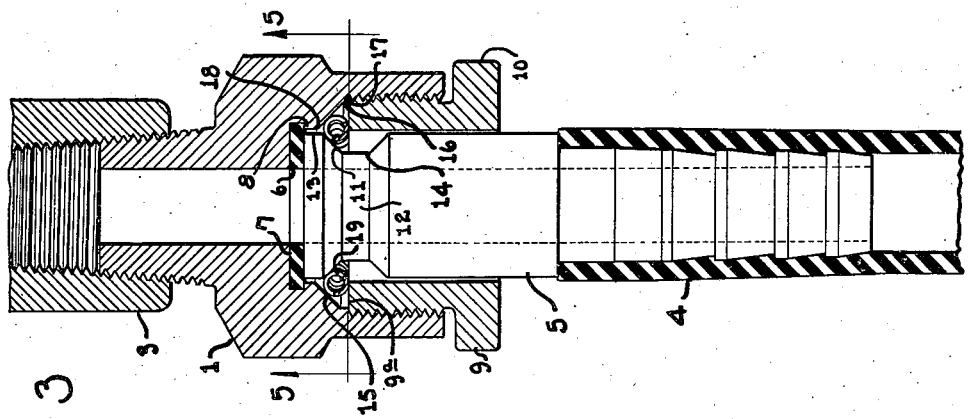
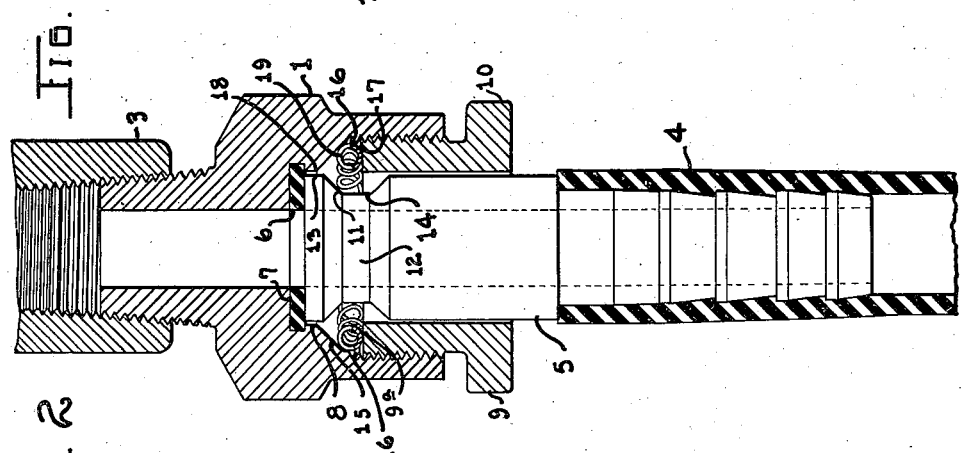
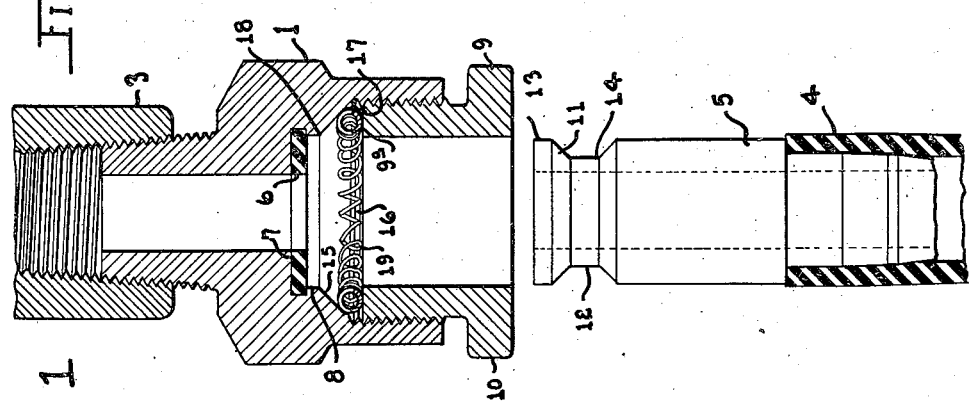
Inventor
WILLIAM H. MILLER
By Toulmin & Toulmin
Attorneys

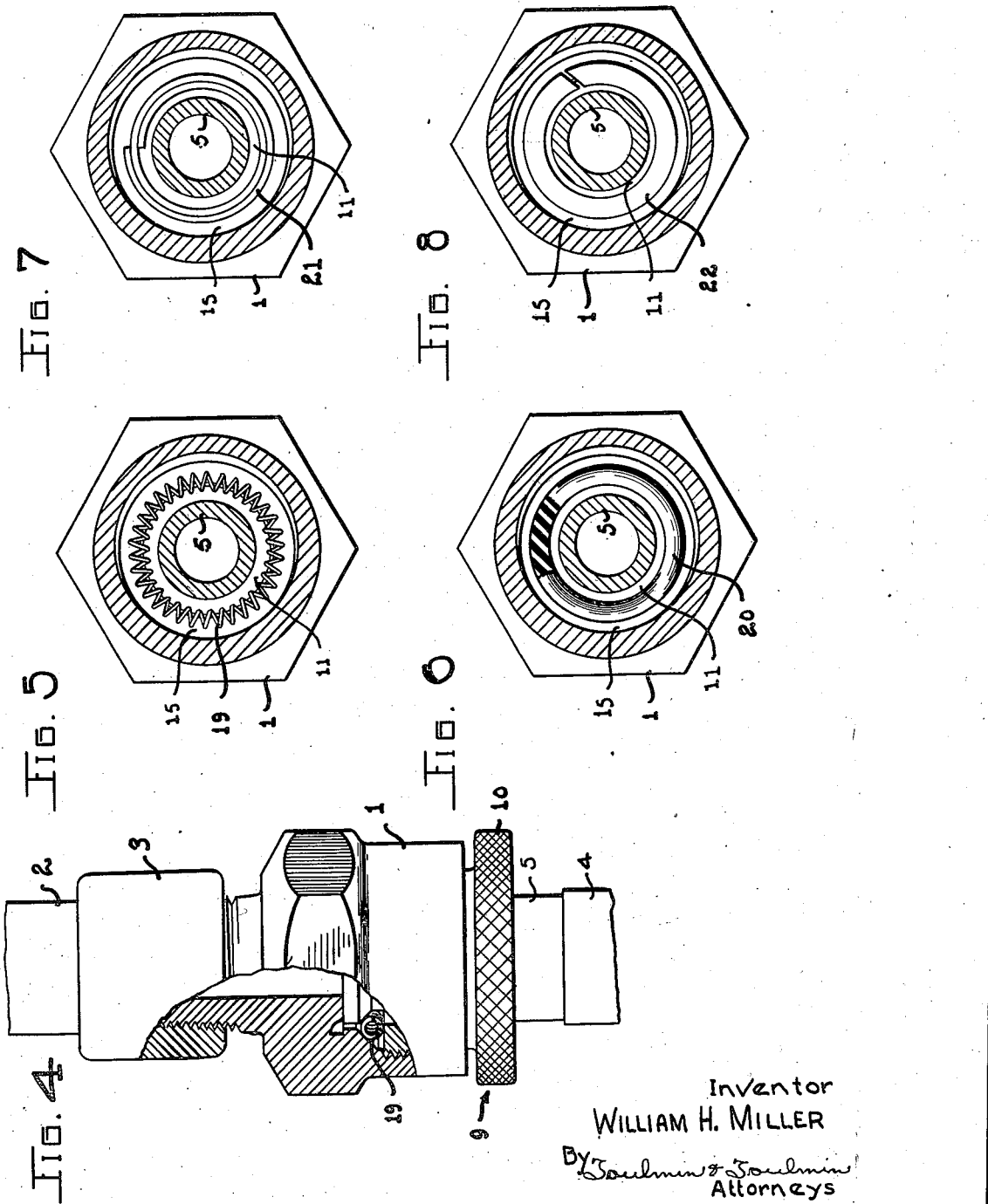

Patented Dec. 31, 1940

2,226,826

UNITED STATES PATENT OFFICE 2,226,826

QUICK DETACHABLE COUPLING

William H. Miller, Royal Oak, Mich., assignor to The Flex-O-Tube Company, Detroit, Mich., a corporation of Delaware Application September 18, 1939, Serial No. 295,395

1 Claim. (Cl. 285—167)

This invention relates to a quick detachable coupling and more particularly to such a coupling which is employed for coupling together sections of hollow conduit such as pipe, flexible tubing and the like. The coupling of the present invention is particularly applicable in the making of rapid and simple connections between air or pressure lines between trucks and trailers although it is to be understood that it is not limited to such application but may be used anywhere where it is desired to have a quickly attachable or detachable coupling between two sections of hollow conduit.

It is an object of the invention to provide a quick detachable coupling which employs a deformable means engaging a shoulder on one of the conduit members and pressing said conduit member against the end of the cooperating conduit member to form a fluid tight seal.

It is another object to provide a quick detachable coupling whereby sections of conduit may be very quickly attached or detached by manual means without requiring the use of tools of any kind, and wherein attachment or detachment is obtained by simple rotation of an easily manually rotatable sleeve a few revolutions.

It is a further object to provide a quick detachable coupling which employs a deformable and resilient locking member which is normally larger than the inserted end of the conduit member and which after insertion of the end of the conduit member is adapted to be readily deformed so as to be smaller than a portion of the inserted end which is disposed inwardly of the locking member whereby to lock the two conduit sections together.

It is still another object to provide a coupling of the foregoing type which is adapted to be attached and detached innumerable times without appreciable wear.

Other objects of the invention will more fully hereinafter appear.

In the accompanying drawings:

Figure 1 is a section of the preferred embodiment of the invention showing the parts in uncoupled relationship and just as one conduit section and the body of the coupling are being brought together.

Figure 2 is a similar section showing the parts of Figure 1 as they are disposed following insertion of the end of the conduit into the body of the coupling but before tightening of the sleeve into the body of the coupling to lock the parts together;

Figure 3 is a similar section but showing the parts in locked relationship;

Figure 4 is a plan view, partly broken away, of the locked coupling of Figures 1 to 3 showing the exterior of the locked coupling and also showing one conduit section which is not quickly attachable to and detachable from the body of the coupling;

Figure 5 is a transverse section of Figure 3 along the line 5—5, looking in the direction of the arrows;

Figure 6 is a similar transverse section but showing the employment of a rubber torus or ring as the deformable and resilient locking member in place of the resilient endless spring of Figures 1 to 5;

Figure 7 is a similar transverse section but showing the employment of a resilient spiral washer as the locking member; and Figure 8 is a similar transverse section of another modification of the invention showing the use of a flat, split washer as the locking member.

Describing first the embodiment shown in Figures 1 to 5, the coupling comprises a body portion 1 which is relatively permanently attached to conduit 2 (Fig. 4) as by a threaded member 3 which engages the conduit 2 or a sleeve at the end of said conduit and threadably engages the externally threaded end of the body portion 1 of the coupling. 4 represents a cooperating conduit member which is to be coupled to conduit member 2 so as to be in fluid-transmitting relationship therewith. Inserted in the end of conduit member 4 is a stepped hollow stem 5 which is adapted to engage with the body portion of the coupling and to be detachably connected thereto in a manner which will presently appear. The inward end of stem 5 is flat and is adapted to engage a gasket 6 which is disposed against the cooperating flat annular seat 7 formed at the inward end of the stem-receiving recess in the body portion of the coupling. Gasket 6 is held in place by inwardly extending annular ring 8 which is formed integral with body 1. Gasket 6 is made of rubber or other suitable resilient material. It will be apparent that sealing gasket 6 is not essential to the invention as a metal to metal seat may be employed provided the seat 7 and the end of the stem 5 are machined sufficiently accurately or one or both of the same is made of deformable metal such as brass or the like.

Surrounding stem member 5 and threadably engaging the inward portion of the stem receiving recess is a sleeve 9 which is provided with a knurled annular rim 10 which is preferably of larger diameter than that portion of body 1, which is adjacent thereto, so as to allow manipulation of sleeve 9 with the fingers even though it is relatively close to the body 1.

Formed on stem 5 is a shoulder 11 which is preferably adjacent the inward end of the stem 5. This shoulder is conveniently formed by a groove 12 at the inward end of the stem 5. Stem 5 is so formed that its diameter at no point of its inserted portion is greater than the inner diameter of sleeve 9 so that stem 5 may be inserted into or withdrawn from body 1 through sleeve 9. Thus, the largest portion of shoulder 11, which has the diameter of the portion indicated at 13, is smaller than the inner diameter of sleeve 9. It will be apparent that the stem 5 may be formed outwardly of shoulder 11 with a diameter equal to that indicated at 14 although this will allow more play between stem 5 and sleeve 9 and therefore will not be as advantageous as the use of stem 5 which throughout a major portion of its inserted portion is of a diameter nearly equal to the inner diameter of the sleeve 9.

The inner portion of the stem receiving recess of body 1 is provided with a conical zone 15 which extends from the inward end 17 of threads 16, where it is of largest diameter to point 18 where it is of smallest diameter. Point 18 marks the beginning of gasket-retaining shoulder 8.

Disposed between the conical zone 15 of the body and the flat inward end 9a of the sleeve 9 is a resilient, deformable, endless spiral spring 19. Spiral spring 19 normally tends to expand so as to be of larger diameter than the shoulder 11 on stem 5 and is shown in this expanded position in Figures 1 and 2. It is adapted to be deformed inwardly so as to be of smaller diameter than shoulder 11 by screwing sleeve 9 forward thus forcing spring 19 to contract radially inward until it is of smaller diameter than the largest diameter portion 13 of shoulder 11.

In operation assuming that the parts are in uncoupled relation they are brought into the position shown in Figure 1 whereupon stem 5 is inserted into the recess of body 1 through sleeve 9 and through spring 19 until it is the position shown in Figure 2, its inward end engaging gasket 6. Sleeve 9 is then rotated in such manner as to force it inwardly of the body by grasping the knurled portion 10 and turning the sleeve inwardly. Sleeve 9 is screwed inwardly until spring 19 has moved along the conical zone 15 and has contracted radially until it contacts shoulder 11. The inward motion of the sleeve 9 will compress spring 19 and force stem 5 into leak-proof engagement with gasket 6 and seat 7. Thus, a leak-proof connection has been accomplished without the use of tools and by simply turning sleeve 9 through a few revolutions. This is to be contrasted with the number of revolutions which would be necessary were shoulder 11 of larger diameter than the inner diameter of sleeve 9, which would make it necessary to go to the inconvenience of threading stem 9 with body 1 and of turning stem 9 all the way into the body 1. In addition the present invention eliminates the necessity for leaving the sleeve on the end of the conduit section 4 which would be involved were shoulder 11 of larger diameter than the inner diameter of sleeve 9.

In order to detach conduit 4 from body 1, it is only necessary to rotate sleeve 9 outwardly a few revolutions until deformable spring 19 has expanded radially sufficiently to allow shoulder 11 of stem 5 to be removed therethrough. Stem 5 and associated conduit 4 may then be pulled outwardly, stem 5 pressing outwardly through spring 19 and sleeve 9. These operations of attaching and detaching the coupling members 5 and 1 may be repeated any number of times without damage to any of the parts.

In the modification shown in Figure 6 a rubber torus 20 is employed in place of spring 19. This resilient rubber torus 20 is normally of larger diameter than the largest diameter of shoulder 11 and is adapted to be contracted inwardly by rotation of sleeve 9 so as to cause it to engage shoulder 11 and force stem 5 into fluid-tight engagement with body 1.

Figure 7 portrays another modification of the invention wherein a spiral washer 21 of suitable resilient material such as spring steel or spring brass is employed as the locking member. When using this modification as when using the modifications heretofore described, the spiral washer 21 is adapted to be forced into a smaller diameter than the shoulder portion 11 of stem 5 and to thereby force stem 5 into tight engagement with gasket 6 and body seat 7.

Figure 8 represents another modification wherein flat split washer 22, which is similar to a piston ring, is employed. Here again the washer is adapted to be forced to contact radially by the movement of sleeve 9 into body 1, forcing washer 22 along conical zone 15 and consequently inwardly against shoulder 11.

As will be apparent from the foregoing the coupling of my inventon makes for a number of advantages. It is quickly and readily attachable or detachable without the use of tools of any kind. It makes possible a fluid tight connection in a minimum amount of time. In addition it allows the conduits to be turned relative to one another. Thus conduit stem 5 may be freely rotated in the coupling and yet there is fluid tight engagement of its end with the body of the coupling.

It will be understood that I intend to comprehend within my invention such modifications as may be necessary to adapt it to varying conditions and uses and that the invention is to be construed as limited only by the appended claim.

Having thus fully described my invention, what I claim as new and desire to secure by Letters Patent is:

A quick detachable coupling comprising a tubular body having an end portion of enlarged diameter for receiving a nipple, said nipple having a circumferential groove spaced from the outer end and with an outwardly inclined wall, an annular seat in said tubular body, gasket means positioned on said annular seat adapted to receive the end of said nipple in abutting engagement, said enlarged end portion being threaded to receive a cylindrical sleeve, said cylindrical sleeve having a central bore for telescopingly receiving said nipple, said tubular member having an outwardly inclined annular surface adjacent the inner end of said threaded portion, and radially contractable coil spring means adjacent the end of said sleeve and adapted to be forced by said sleeve along said outwardly inclined annular surface and into engagement with the inclined wall of the nipple for tightly pressing the end of the nipple against the gasket to thereby secure said nipple in abutting engagement with said gasket.

WILLIAM H. MILLER.